United States Patent [19]

Kaiser et al.

[11] Patent Number: 5,400,654
[45] Date of Patent: Mar. 28, 1995

[54] ACCELERATION SENSOR WITH HALL ELEMENT

[75] Inventors: Harry Kaiser, Markgröningen; Rainer Willig, Tamm, both of Germany

[73] Assignee: Robert Bosch GmbH, Stuttgart, Germany

[21] Appl. No.: 857,920

[22] PCT Filed: Oct. 5, 1991

[86] PCT No.: PCT/DE91/00788

§ 371 Date: May 8, 1992

§ 102(e) Date: May 8, 1992

[87] PCT Pub. No.: WO92/08138

PCT Pub. Date: May 14, 1992

[30] Foreign Application Priority Data

Oct. 25, 1990 [DE] Germany ............. 40 33 885.1

[51] Int. Cl.⁶ ................................. G01P 15/11
[52] U.S. Cl. ...................... 73/517 R; 73/DIG. 3
[58] Field of Search ........... 73/517 R, 516 R, DIG. 3

[56] References Cited

U.S. PATENT DOCUMENTS

| | | | |
|---|---|---|---|
| 4,825,697 | 5/1989 | Huber | 73/517 R |
| 4,870,864 | 10/1989 | Io | 73/517 R |

FOREIGN PATENT DOCUMENTS

| | | | |
|---|---|---|---|
| 0251069 | 1/1988 | European Pat. Off. | |
| 2-309258 | 12/1990 | Japan | 73/514 R |
| 8706347 | 10/1987 | WIPO | |

*Primary Examiner*—John E. Chapman
*Attorney, Agent, or Firm*—Michael J. Striker

[57] ABSTRACT

An acceleration sensor has a casing, a deflection spring arranged in the casing and having one end fixed to the casing and a free end, a Hall element, at least one sensor element attached to the free end of the spring and being in active connection with the all element, and a plate having a recess. The deflection spring together with the sensor element is arranged in the recess of the plate, and a hybrid circuit is provided with the Hall element and located on the plate.

10 Claims, 3 Drawing Sheets

ACCELERATION SENSOR WITH HALL ELEMENT

BACKGROUND OF THE INVENTION

The present invention relates to an acceleration sensor. More particularly, it relates to an acceleration sensor which has a deflection spring fixed at one end and arranged in a casing, at the free end of which at least one sensor element is attached which is in active connection with a Hall element. In such a sensor, a permanent magnet is attached to the deflection spring as a seismic mass and is in an active connection with a Hall element for the generation of a measuring signal. The Hall element is fixed to a hybrid circuit which is arranged on the base plate of the acceleration sensor. The deflection spring is configured perpendicular to the hybrid circuit and has a sloping longitudinal edge, whereby it is intended to prevent twisting of the spring. However, this arrangement of the deflection spring and its design makes the acceleration sensor relatively high. Moreover, the spring can be easily broken or plastically deformed, should the acceleration sensor be dropped, which would falsify the measured values and make the sensor no longer operable.

SUMMARY OF THE INVENTION

Accordingly, it is an object of the present invention to provide an acceleration sensor of the above mentioned type which avoids the disadvantages of the prior art.

In keeping with these objects and with others which will become apparent hereinafter, one feature of the present invention resides, briefly stated, in an acceleration sensor of the above mentioned general type in which the deflection spring together with the sensor element is arranged in a recess of a plate, and a hybrid circuit with the Hall element is located on the plate.

An acceleration sensor in accordance with the invention has the advantage that it is of very small height, that is, it has a very small volume. The spring with the seismic mass is arranged protected in the recess of a plate. This ensures that it can be safely dropped from at least 1 meter height onto concrete. The plate itself and the hybrid circuit arranged on the plate will serve as overload protection. This arrangement furthermore shrouds the deflection spring and the sensor magnets, so that the measuring equipment is protected from soiling. The resonance frequency of the deflection spring can be easily influenced by the choice of material for the spring. If tombac is selected for the deflection spring, then the deflection spring is no longer deformed in the sensing direction and in the bowed direction. Due to the stops for the seismic mass being geometrically optimally arrangeable, an approximately straight line is obtained for the progression of the measuring signal. Since the sensor magnets also represent the seismic mass, this may be kept as small as possible, whereas the magnetic induction is relatively large, due to the choice of permanent magnets. Due to its connection with the mounting plate and the base plate of the housing, the hybrid circuit rearside is connected to vehicle earth. This results in a relatively low EMC sensitivity (EMC=electromagnetic compatibility). The number of the individual parts used is relatively small. The sensor can also be made in a small number of mounting and assembly steps. Mounting of the sensor can be carried out almost fully automatically. After fitting the connector housing, the hybrid circuit can be balanced in a simple manner, with the housing itself not yet slid into position. By using the bonding technique for connection between the hybrid circuit and the connector plug, this step of manufacture can be automated and it can be carried out in a safe manner, i.e. without high failure rates.

The permanent magnets attract each other, so that only simple gluing is required. Gluing is required primarily only in order to prevent displacement of the permanent magnets relative to each other in the event of any knock. The base plate used with its connection flanges provides high accuracy of fitting within the vehicle. Based on the simple symmetrical design and the solid, sturdy measuring element of the acceleration sensor, good temperature behaviour of the sensor can be achieved. The interior of the housing used is so large that it is possible at any time to use different hybrid circuit, in particular hybrid circuit with a high IC frame. If hybrid circuit with a high power loss and thus with high heat generation are used, this heat can be dissipated via the base plate, to the vehicle body. The sensor can be produced very economically. The measuring element attached to the connector housing is merely pushed into the casing, such that the casing and the connector housing engage with each other.

In accordance with a further feature of the present invention, the end of the deflection spring away from the sensor element is welded to the plate. The deflection spring can be of approximately rectangular shape. The size of the recess can be matched to the measuring range of the deflection spring. The plate can be attached to a connector housing of the casing by means of several cheese-head rivets.

Still a further feature of the present invention is that a base plate arranged on the casing has fixing flanges, and the base plate rests, at least in the region of the sensor element, against the end of the plate which is away from the hybrid. The base plate can be composed of non-magnetic but electrically conductive material.

The sensor element can be composed of two permanent magnets with magnetic polarities running almost parallel to each other and aligned in the direction toward the Hall element, and the polarities can be set in opposition to each other.

Finally, the casing and the connector housing can be connected to each other by means of a snap-type closure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 shows a longitudinal section through the sensor in accordance with FIG. 1, and FIG. 6 gives a view of the casing interior, while

DESCRIPTION OF THE PREFERRED EMBODIMENT

Figure 1:
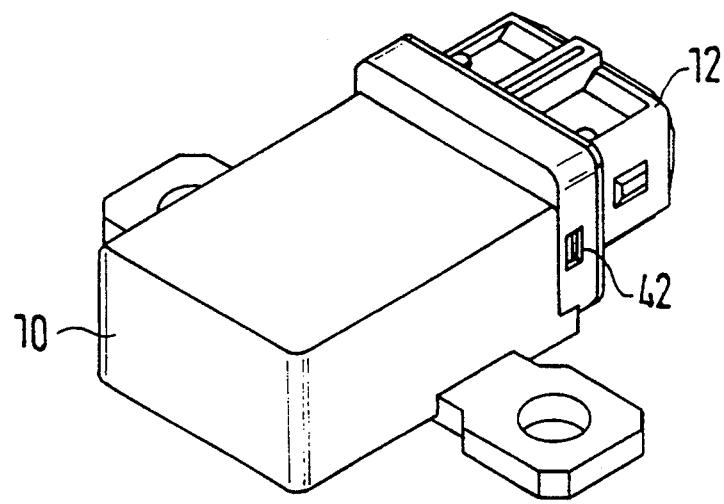
FIG. 1 shows a preassembled part inserted into the casing of the sensor.

In FIG. 1, number 10 describes the casing of an acceleration sensor 11, which has a connector housing 12 with electrical connection plugs, not shown, engaging with the casing 10. The construction of the sensor 11 can be recognized from FIG. 2. A connecting plate 13 is fixed to the connector housing 12 by means of several cheese-head rivets 14. As shown in FIG. 3, the plate 13 has a recess 15 which has an approximately T shaped cross-section, in which a measuring element 16 is arranged, consisting of an approximately rectangular deflection spring 17 and a seismic mass 18. The recess 15 is of such size as to allow for the movement of the deflection spring 17 as required for the desired measuring range, while the plate 13 serves simultaneously as a stop for the measuring element 16 and hence as an overload protection for the deflection spring 17. In the vicinity of the deflection spring 17, the recess 15 should enable the movement of the deflection spring 17 within the desired measuring range, whereas in the event of an impact on one of the front faces of plate 13, a rapid restriction of the deflection spring 17 should be brought about. For the protection against adverse mechanical influences, the deflection spring 17 and the seismic mass 18 should not project beyond the top or bottom side of plate 13. The deflection spring 17 is of tombac material.

One end of the deflection spring 17 is laser welded to the plate 13. The seismic mass 18 consists of two permanent magnets 20, 21, the polarity of which is aligned perpendicularly to the direction of movement of the deflection spring 17. Moreover, the polarity of the two permanent magnets 20, 21 is in opposing direction, so that the permanent magnets 20, 21, arranged on each side of the deflection spring 17 attract each other. Furthermore, the permanent magnets 20, 21 are glued in order to prevent displacement of the permanent magnets 20, 21 relative to each other, due to knocks: a simple, economically priced glue being adequate.

Figure 2:
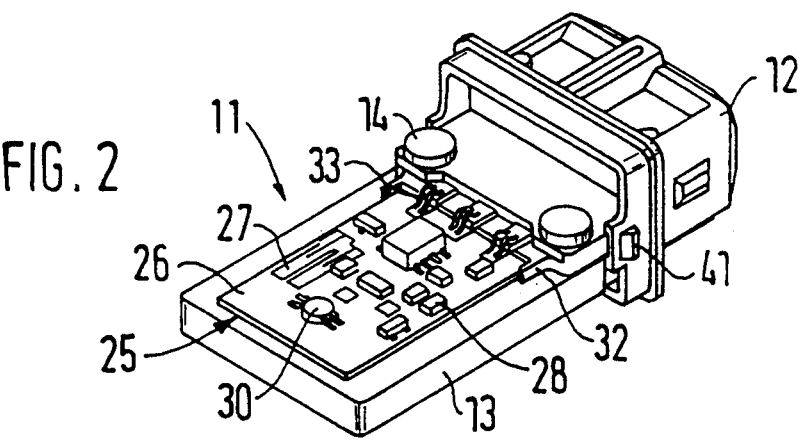
FIG. 2 shows the pre-assembled part.
Figure 3:
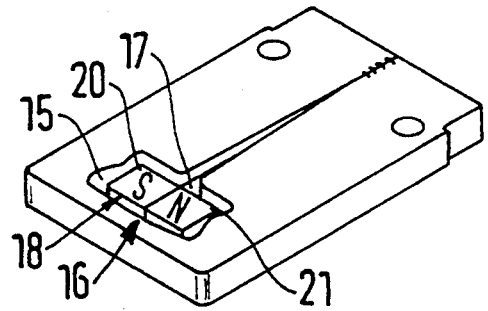
FIG. 3 shows a plate with a deflection spring welded to it and the seismic mass.
Figure 4:
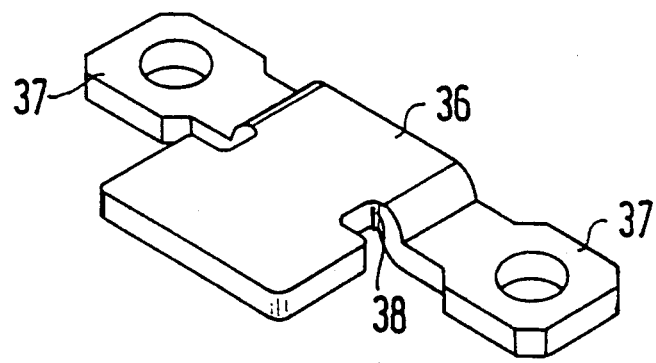
FIG. 4 shows the base plate.

As shown in FIG. 2, the plate 13 has a hybrid circuit 25 arranged on it, on the support 26 of which there are thick-film resistors 27 and electronic components 28 arranged, such as transistors, resistors, etc. of an electronic evaluation circuit. The electronic components 28 are interconnected by thick-film conductor paths or bonding wires. The support 26 of the hybrid circuit 25 further carries a Hall element 30, which should be arranged as centrally as possible above the contact line of the two permanent magnets 20, 21. The support 26 of the hybrid circuit 25 is adjusted on the plate 13 by means of stop rails 32 which are arranged on the connector housing 12. The electronic components 28 of the hybrid circuit 25 are connected to the plug connectors of the connector housing 12 by means of bonding wires 33.

Figure 6:
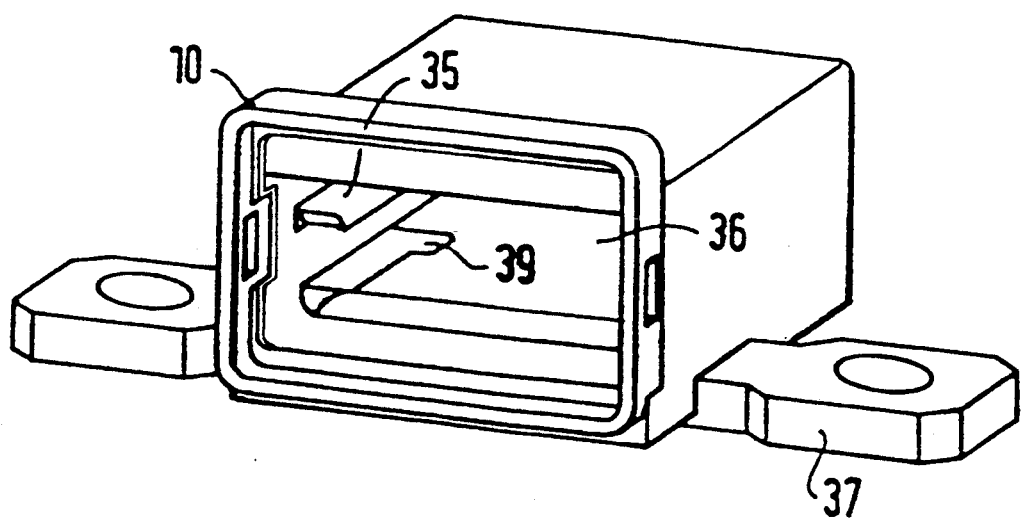
Figure 7:
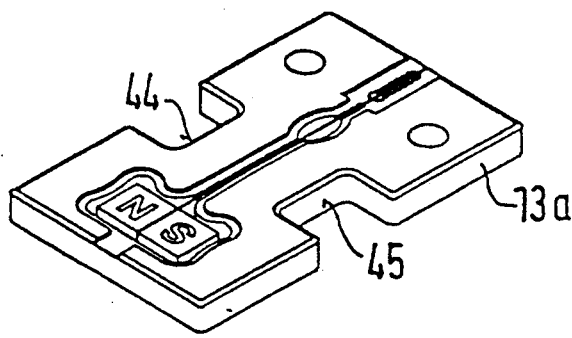
FIGS. 7 to 10 show modifications of details.
Figure 8:
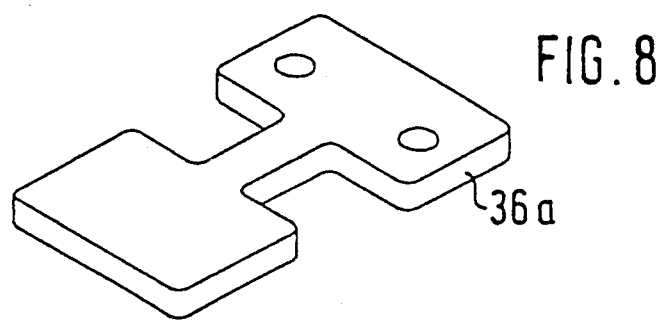
Figure 9:
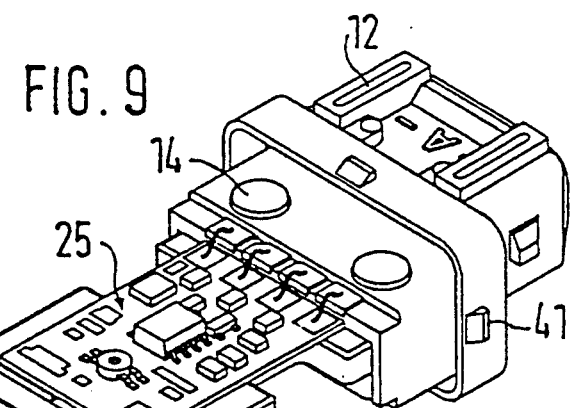
Figure 10:
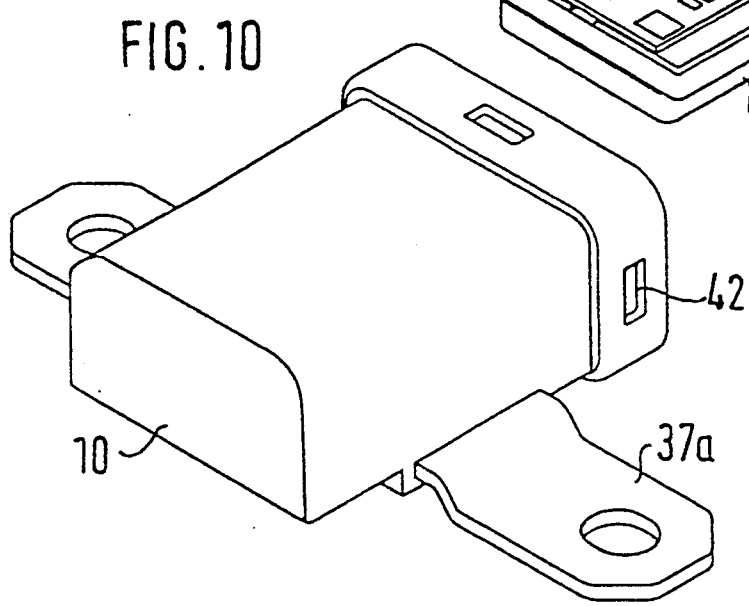

The plate 13 rests in the interior of the casing 10 against a guide rail 35, as can be seen in FIG. 6. The casing 10 is placed on a base plate 36 or injection-moulded onto this plate which has two flange-type extensions 37. In the region of the flange-type extensions 17, the base plate 36 has a recess 38 on each side, into which a casing extension 39 projects for the purpose of attachment.

Figure 5:
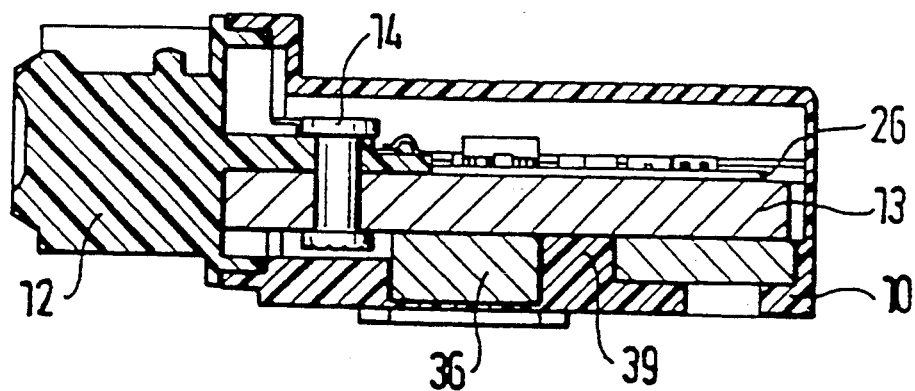

As will be seen from FIG. 5, the connection plate 13 locates on the base plate 36. The base plate 36 itself consists of copper or another non-magnetic but electrically conductive material. It thus closes off the underside of the recess 15 of plate 13 and is therefore also in active connection with the permanent magnets 20, 21 of the measuring element 16. This provides a double function of the permanent magnets 20, 21. They act to represent both the seismic mass 18 of the deflection spring 17 and to effect, together with the base plate 16, damping of the vibration of the deflection spring 17. During the movement of the permanent magnets 20, 21, eddy currents develop on the base plate 36, which counteract the movement of the deflection spring 17, thereby damping it.

The acceleration sensor 11 is arranged, for example, perpendicular to the travel direction of a vehicle. The inert mass in the form of the deflection spring 17 and the permanent magnets 20, 21 is deflected proportionately to the acceleration which acts perpendicular to the deflection spring 17.

The deflection is further determined by the spring rate of the deflection spring 17, i.e. its shape and material, and by the inertia mass. The measuring signal is effected by the movement of the permanent magnets 20, 21, i.e. of the magnetic field created by them, in the region of the Hall element 30. As is generally known, changing the magnetic field causes a voltage to be induced in the Hall element 30 which is evaluated by the electronic evaluation circuit of the hybrid circuit 25. Even minor movements of the deflection spring 17 effect a change of the magnetic field in the vicinity of the Hall element 30. At the same time, the movement of the permanent magnets 20, 21, effects vibration damping of the deflection spring 17 due to the eddy currents generated in the surface of the base plate 36. Due to these eddy currents induced during the vibration, the vibration energy of the deflection spring 17 is degenerated. With suitable design of the deflection spring/magnetic circuit system, it is possible to achieve any desired damping.

The structural design of the acceleration sensor 11 allows it to be manufactured in a particularly simple and economic manner. For this purpose, the deflection spring 17, together with the permanent magnets 20, 21, which are glued on at one end, are inserted into the recess 15 of the connection plate 13, and the other end of the deflection spring 17 is laser welded to the plate 13. The connection plate 13 is now attached to the connector housing 12 by means of the cheese-head rivets 14. In the next step of manufacture, the prefabricated hybrid circuit 25 is glued to the connection plate 13, together with the thick-film resistors 27, which are arranged on the support 26, and the electronic components 28. The stop rails 32 of the connector housing 12 are used for centering the hybrid circuit 25 on the connection plate 13. Using a simple additional setting device, which is temporarily applied to the connection plate 13, it is possible to displace the hybrid circuit 25 on its longitudinal axis, so that the Hall element 30 sits exactly over the contact line of the two permanent magnets 20, 21. This centering is necessary in order to obtain an accurate, optimum, and reproducible, measuring signal. The setting device is subsequently removed. The glue for fixing the hybrid circuit 25 to the connection plate 13 can now be left to harden or cure. The hybrid circuit 25 is then electrically connected, by means of bonding wires 33, to the connector plugs of the connector housing 12. Thus, a prefabricated and easily manageable pre-assembly part, such as shown in FIG. 2, is obtained.

The casing 10 is an injection moulding and is moulded onto the base plate 36. In this way, a second pre-assembled part is created, which consists of the base plate 36 and the casing 10, which are permanently connected to each other. These two pre-assembly parts are now pushed one into the other, with the connector housing 12 engaging with locking pieces 41 in recesses 42 of the casing 10.

Prior to assembly of the two sub-assemblies, the hybrid circuit 25 can be electrically balanced and checked.

In the modifications of the embodiment example shown in FIGS. 7 to 10, the connection plate 13a has recesses 44, 45, approximately in the center between the welding point of the deflection spring 17 and the permanent magnets 20, 21 which serve as a seismic mass, these recesses are provided in order to keep the weight of the connection plate 13a as low as possible. Furthermore, the base plate is constructed of several parts and consists of a copper plate 36a and a mounting lug 37a. The copper plate 36a has approximately the same form as the connection plate 13a. The mounting lugs 37a take on the function of the extensions 37, such as are provided in the other embodiment example. The copper plate 36a attaches to the underside of the connection plate 13a and has the same effect as already described above for the base plate 36. During assembly, the connection plate 13a is placed onto the copper plate 36a and, as above, is fixed, together with the hybrid 25, by means of several cheese-head rivets 14, in the connector housing 12, thereby producing a first pre-assembled part. The mounting lugs 37a are already attached to the casing 10 during the injection moulding of the casing, thereby producing the second pre-assembled part. The two sub-assemblies are pushed one into the other, and the sensor can be fixed to a vehicle by means of mounting lugs 37a.

It will be understood that each of the elements described above, or two or more together, may also find a useful application in other types of constructions differing from the types described above.

While the invention has been illustrated and described as embodied in an acceleration sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An acceleration sensor, comprising a casing; a deflection spring arranged in said casing and having one fixed end and a free end; a Hall element; at least one magnetic sensor element attached to said free end of said spring and cooperating with said Hall element so that changes of magnetic field of said at least one magnetic sensor element induce an electric voltage in said Hall element; and a plate having a recess, said deflection spring together with said magnetic sensor element being arranged in said recess of said plate; and a hybrid circuit with said Hall element and located on said plate so that said plate supports said hybrid circuit and also serves as an overload protection for said deflection spring.

2. An acceleration sensor as defined in claim 1, wherein said one end of said deflection spring is welded to said plate.

3. An acceleration sensor as defined in claim 1, wherein said deflection spring has a substantially rectangular shape.

4. An acceleration sensor as defined in claim 1, wherein said deflection spring has a measuring range, said recess having a size which matches to said measuring range of said deflection spring.

5. An acceleration sensor as defined in claim 1, wherein said casing has a connector housing, said plate being attached to said connector housing.

6. An acceleration sensor as defined in claim 5; and further comprising a snap-type closure connecting said casing with said connector housing.

7. An acceleration sensor, comprising a casing; a deflection spring arranged in said casing and having one fixed end and a free end; a Hall element; at least one magnetic sensor element attached to said free end of said spring and cooperating with said Hall element so that changes of magnetic field of said at least one magnetic sensor element induce an electric voltage in said Hall element; and a plate having a recess, said deflection spring together with said magnetic sensor element being arranged in said recess of said plate; a hybrid circuit with said Hall element and located on said plate so that said plate supports said hybrid circuit and also serves as an overload protection for said deflection spring, said casing having a connector housing to which said plate is attached; and a plurality of cheese-head rivets which attach said plate to said connector housing.

8. An acceleration sensor, comprising a casing; a deflection spring arranged in said casing and having one fixed end and a free end; a Hall element; at least one magnetic sensor element attached to said free end of said spring and cooperating with said Hall element so that changes of magnetic field of said at least one magnetic sensor element induce an electric voltage in said Hall element; and a plate having a recess, said deflection spring together with said magnetic sensor element being arranged in said recess of said plate; a hybrid circuit with said Hall element and located on said plate so that said plate supports said hybrid circuit and also serves as an overload protection for said deflection spring; and a base plate arranged on said casing and having fixing flanges, said plate having an end which is away from said hybrid circuit, said base plate resting against said end of said plate at least in the region of said sensor element.

9. An acceleration sensor as defined in claim 8, wherein said base plate is composed of non-magnetic but electrically conductive material.

10. An acceleration sensor, comprising a casing; a deflection spring arranged in said casing and having one fixed end and a free end; a Hall element; at least one magnetic sensor element attached to said free end of said spring and cooperating with said Hall element so that changes of magnetic field of said at least one magnetic sensor element induce an electric voltage in said Hall element; and a plate having a recess, said deflection spring together with said magnetic sensor element being arranged in said recess of said plate; and a hybrid circuit with said Hall element and located on said plate so that said plate supports said hybrid circuit and also serves as an overload protection for said deflection spring, said sensor element having two permanent magnets with magnetic polarities running almost parallel to each other and aligned in direction toward said Hall element, and the polarities of said permanent magnets are set in opposition to each other.

* * * * *